United States Patent Office 3,517,267
Patented June 23, 1970

3,517,267
CONTROLLED LINEAR HALF-WAVE OR FULL-WAVE ALTERNATING CURRENT SIGNAL DETECTOR USING LINEAR AMPLIFIER COMBINED WITH NON-LINEAR FEEDBACK CIRCUIT
Gilbert Marcel Ferrieu, Route du Port,
22 Locquemeau, France
Filed Feb. 24, 1967, Ser. No. 618,494
Claims priority, application France, Mar. 7, 1966,
52,269
Int. Cl. H03d 1/06; H03f 1/34
U.S. Cl. 329—101
5 Claims

ABSTRACT OF THE DISCLOSURE

A linear detector for rectifying alternating current signals of arbitrary waveshape, comprising a high-gain amplifier having an input terminal, an output terminal and a common terminal and provided with a non-linear negative feedback circuit connecting said output terminal to said input terminal through the series assembly of a resistor and the semiconductor path between the base electrode and one of the other electrodes of at least one transistor, whereby when said signals are applied between said input and common terminals, rectified signals are received between said common terminal and the other one of said other electrodes of said transistor or transistors.

CROSS-REFERENCE TO RELATED APPLICATION

This invention relates to improvements in the devices described in the co-pending U.S. patent application Ser. No. 379,186 filed June 30, 1964, now U.S. Pat. Ser. No. 3,316,493 in the name of the present applicant.

BACKGROUND OF THE INVENTION

Field of the invention

The invention relates to a half-wave or full-wave linear detector for detecting, i.e. rectifying alternating current electrical signals of arbitrary waveform, and in fact enabling the detection of signals of very low level and random waveform, the frequency spectrum of which may cover a very wide frequency band, and providing also high linearity in rectification together with a wide dynamic range of the amplitude of said signals.

By "half-wave detector" is to be understood in the following description a rectifying device receiving at its input an alternating signal voltage and delivering at its output a unidirectional voltage having an amplitude proportional to that of said alternating voltage at any instant when the latter has a predetermined polarity, and a zero amplitude at any instant when said alternating voltage has the other polarity. By "full-wave detector" is to be understood a rectifying device receiving at its input an alternating signal voltage and delivering at its output a unidirectional voltage having an amplitude proportional to that of said alternating voltage whatever be the polarity of the latter at the considered instant.

Such detectors are useful, for instance, in certain electrocoustic applications, in particular in so-called "contiguous frequency channel vocoders" in which it is necessary to precisely and rapidly measure the energy level in each of the frequency channels, and this within a wide range of variation of the amplitudes of the measured signals.

Description of the prior art

In the already mentioned U.S. Pat. Ser. No. 3,316,493 there is disclosed a controlled linear detector comprising a gating circuit and a limiting amplifier (also called clipping amplifier) to the inputs of which devices the signals to be detected are applied in parallel, the gating circuit being at any given instant rendered conductive or non-conductive, according to the polarity of the input signals at said instant, by the output signal from the limiting amplifier. The latter comprises a negative feedback circuit the impedance of which varies, as a function of the voltage amplitude of the signals applied to its input, in such a manner that the extremely high or extremely low resistance values offered by the gating circuit to the passage of said signals, all in accordance with their polarity, are practically constant and independent of the amplitude and frequency of said signals; or, in other words, such that the linearity of detection is extremely good. With this aim in view, the negative feedback circuit of the amplifier comprises two diodes in parallel connection with opposite conduction directions, which give the limiting amplifier a very high gain for signals having a level below their unblocking threshold and a very low gain for signals whose level is sufficiently high to unblock one or the other of said diodes, the high degree of negative feedback thus obtained preventing saturation of the limiting amplifier and thus also the distortion which would result therefrom.

The gain of the negative feedback limiting amplifier thus being determined by the characteristics of these diodes, its output circuit must then be matched to the characteristics of the gating circuit, the latter being constituted by a transistor.

An object of the present invention is to produce a controlled linear detector in which optimum control of the gating circuit is automatically obtained.

An important feature of the controlled linear detector of the invention is that a single semiconductor element constitutes at the same time the control circuit for the gate and the non-linear element in the negative feedback circuit of the limiting amplifier.

SUMMARY OF THE INVENTION

The main object of the invention is a controlled linear detector for rectifying alternating current electric signals having a first and a second input terminal between which said signals are applied and at least two output terminals. Said detector comprises a high-gain amplifier provided with a first and a second input terminal, a first and a second output terminal and a non-linear negative feeback circuit interconnecting said first input and output terminals. Said detector further comprises a first resistor interconnecting said first input terminals of said detector and amplifier and connection means between said second input terminals of said detector and amplifier. Said non-linear feedback circuit consists of the series assembly of a second resistor having one of its ends connected with said first input terminal of said amplifier and its other end connected with the second terminal of a non-linear impedance the first terminal of which is connected with said first output terminal of said amplifier. Further connection means interconnect said second input and output terminals of said amplifier. The non-linear impedance includes at least one transistor having a base electrode, an emitter electrode and a collector electrode, and said first and second terminals of said non-linear impedance respectively consist of the base electrode and a selected one of said emitter and collector electrodes of said transistor or transistors. At least one of said output terminals of said detector is directly connected with an electrode of said transistor or transistors other than said base and selected electrodes, and another of said output terminals of said detector is connected with said second output terminal of said amplifier.

According to a preferred embodiment of the invention, said detector is provided with two transistors of opposite conductivity types, both of the base electrodes of which are connected with said first output terminal of said amplifier, and with a pair of output terminals respectively and directly connected with said electrodes of one and the other of said transistors other than said base and selected electrodes; and said connection means consist of a direct connection between said second input and output terminals of said amplifier. In this case, rectified voltages corresponding to one and the other of the positive and negative half-waves of the input signal appear at one and the other of the elements of said pair of output terminals.

Also according to a preferred embodiment of the invention, said selected electrodes are the emitter electrodes of said transistors, and said other electrodes connected with said output terminals of said detector are the collector electrodes of same said transistors.

In a usual variant of embodiment of the invention said amplifier has a common input and output grounded terminal which constitutes at the same time said second input and output terminals of said amplifier and said other output terminal of said detector.

In another variant of embodiment of the invention, using two high gain amplifiers and two pairs of transistors, rectified signals of opposite polarities each corresponding to full-wave rectification of the input signals are obtained at two corresponding output terminals of the detector.

Finally, it will be shown how two detectors according to the invention may be combined into a power amplifier having a low distortion throughout a wide frequency band.

Other objects and advantages of the invention will be apparent from the hereinafter given description and the annexed drawings.

DESCRIPTION OF PREFERRED EMBODIMENTS

Although in the examples given in the following, the described embodiments all include at least two transistors, it must be understood that one of these transistors might be suppressed, if a simple half-wave rectification of the input signals and an output signal of a single polarity were desired. However, to avoid saturation effects in the high gain amplifier which is an essential part of said embodiments (such effects being likely to be caused by the charging of capacitors by strong signals, unless the amplifier includes no such capacitors), it would generally be necessary to provide some amplitude limiting means for the undesired half-wave in said amplifier, for instance a Zener diode or a biased conventional semiconductor diode. This being given, the simplest way in which such limitation may be obtained is probably to retain the second transistor, whether it is actually used for detection purposes or not. A further advantage of the two-transistor arrangement is that of giving the detector a constant input impedance for both polarities of the input signal.

Figure 1:
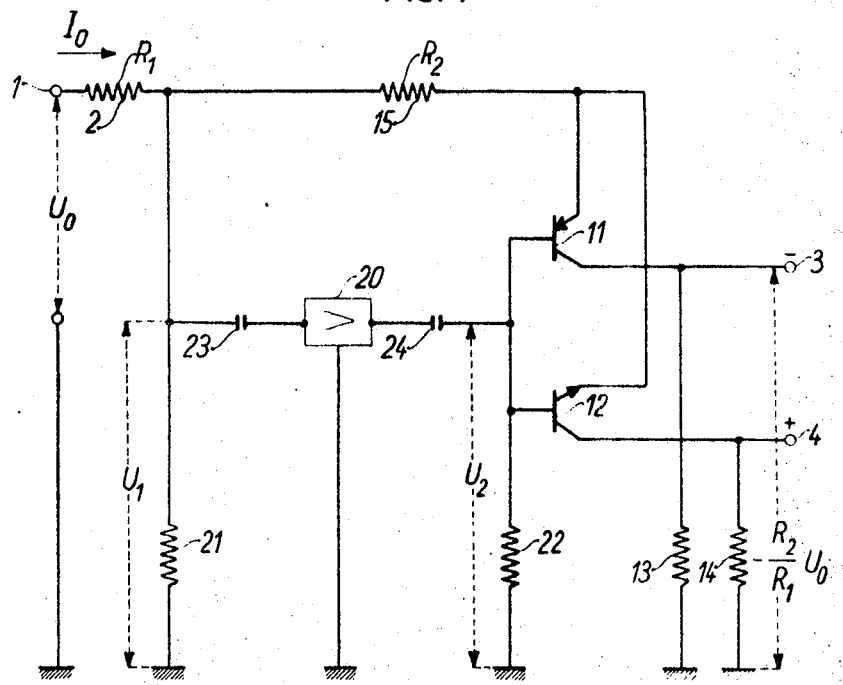
FIG. 1 is a diagram of a linear detector in accordance with the invention.

FIG. 1 illustrates a linear detector using two transistors 11, 12 of opposite conductivity types, the emitters of which are connected in parallel and, through a resistor 15 of resistance $R_2$ and a resistor 2 of resistance $R_1$, these two being connected in series, to an input terminal 1 to which the signals to be detected are applied. The junction point between resistors 2 and 15 is on the one hand grounded via a resistor 21 and on the other connected to the input of an amplifier 20 through a capacitor 23. The output of the amplifier 20 is connected via a capacitor 24 on the one hand to ground, through the medium of a resistor 22 and on the other in parallel to the bases of both transistors 11 and 12, which are respectively of p-n-p and n-p-n type. The collector of the p-n-p transistor 11, which constitutes one of the outputs 3 of the linear detector, is grounded via a resistor 13, and the collector of the n-p-n transistor 12, which constitutes the second output 4 of the linear detector, is ground via a resistor 14.

The amplifier 20 is a conventional unidirectional high-gain amplifier, which inverts the phase of the voltage $U_0$ applied to the input terminal 1 and which is equipped with a negative feedback circuit the impedance of which is a variable one. This feedback circuit is constituted by the resistor 15 placed in series with the diodes constituted by the internal emitter-base paths of transistors 11, 12, which diodes are in a mutual parallel-opposed arrangement. Capacitors 23 and 24 have negligible impedance at the working frequencies of the detector and serve simply as direct-current buffers between amplifier 20 and the remainder of the circuit. It is well-known that a unidirectional amplifier provided with a negative feedback of the shunt type has a very low input impedance. Consequently, the injected current at terminal 1 for a given input voltage $U_0$ is substantially equal to $I_0 = U_0/R_1$ and its output voltage $U_2$ is substantially equal to the product (changed in sign) of the current $I_0$ and the impedance of the negative fedback circuit. Since according to the instantaneous polarity of the input signal, one of the transistors 11 and 12 is blocked and the other saturated, the voltage drop across the resistor 15, as a consequence of the current flowing through transistor 12, brings the potential of the emitters to $(-R_2I_0)$. The resistance between the emitter and the collector of the saturated transistor being very low, a negative signal is obtained at the collector output of transistor 11 (terminal 3) if the voltage $U_0$ of the input signal is positive, whilst at the output terminal 4 of transistor 12 a positive signal is obtained if $U_0$ is negative, the magnitude of the output signal being in both cases $(-R_2U_0/R_1)$.

Figure 8:
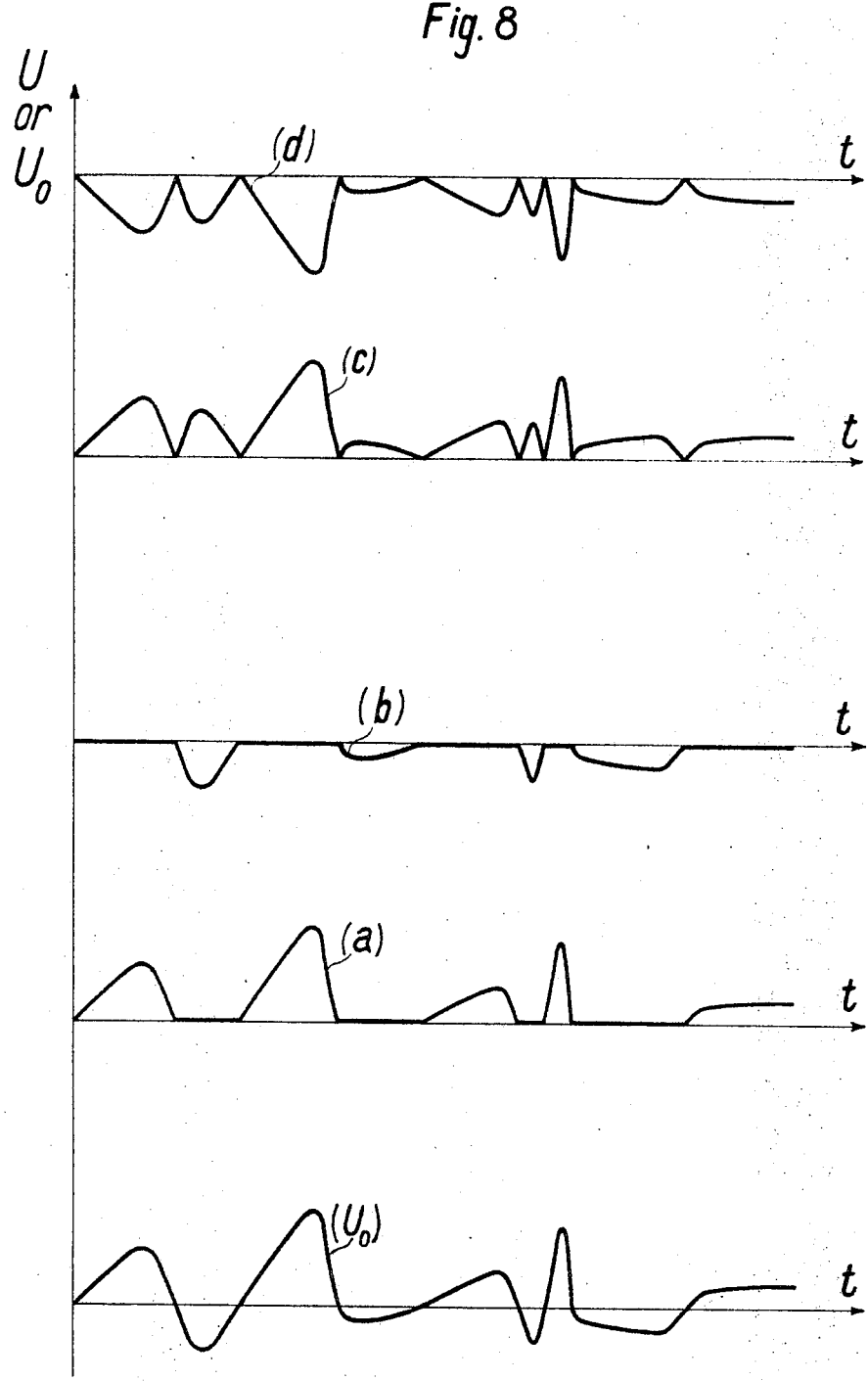
FIG. 8 illustrates the waveshape of signals at various points of the devices of the invention.

Curves $U_0$, (b) and (a) of FIG. 8 respectively illustrate the waveshapes of the signals at terminals 1, 3 and 4 of FIG. 1 as functions of time $t$.

Where the input signal is of very low amplitude, the voltage appearing across the emitter-base diodes of transistors 11, 12 (FIG. 1) is much higher than the voltage to be detected, due to the high resistance of these diodes, this meaning that for each half-wave one of the two transistors is blocked and the other given a base bias which simultaneously unblocks its emitter-base and collector-base diodes and thus makes it operate in fully saturated condition.

Transistors 11 and 12 have been shown in FIG. 1 as having their emitters connected to the input terminal 1 through resistors $R_2$ and $R_1$ and their collectors to the output 3 or 4. A substantially identical mode of operation is obtained if the connection of these transistors are inverted, as shown in FIG. 2, so that the collector-base diode is used in the negative feedback circuit, this reducing the loss voltage between emitter and collector of the saturated transistor.

Figure 2:
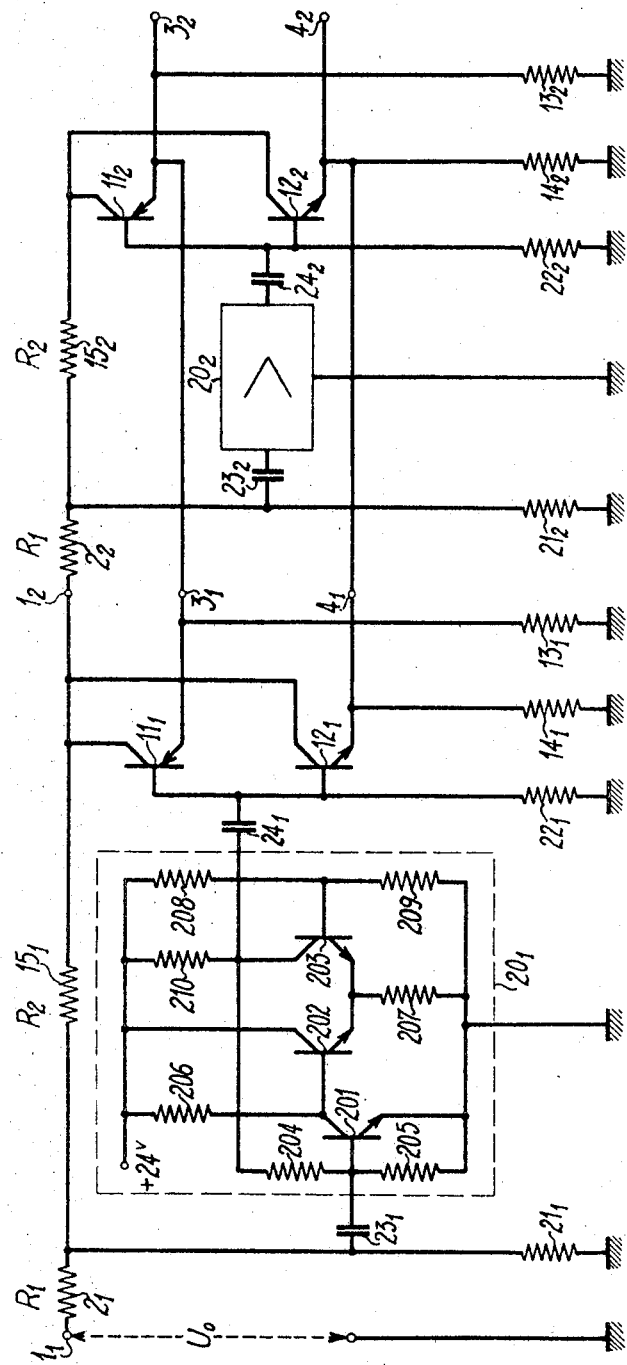
FIG. 2 illustrates how two linear detectors in accordance with FIG. 1 co-operate to produce two output signals of mutually opposite polarities, each of which uses both half-waves of the signal which is to be detected.

FIG. 2 illustrates a combined arrangement of two linear detectors in accordance with FIG. 1, modified in this way, the inputs of which detectors are connected in series and the outputs in parallel so that two output signals are obtained whose absolute values are identical, each one being a signal rectified in accordance with a polarity determined by the two half-waves of the signal being detected.

The two linear detectors coupled in this way have the same reference numbers as in FIG. 1, the one with the index 1 being that which directly receives the signal to be detected and the one with the index 2 being the second one.

It is arranged that the emitters of transistors 11 and 12, and consequently the collectors of transistors $11_1$ and $12_1$ are at a potential substantially equal to $(-R_2U_0/R_1)$. As a consequence, if we make $R_2=R_1$, the signal which appears at the collectors of transistors $11_1$, $12_1$ is identical with the signal applied to the input terminal $1_1$, but has the reverse polarity. The collectors of the transistors $11_1$, $12_1$ are connected to the input terminal $1_2$ of the second linear detector. In addition, the output $3_1$, taken from the emitter of transistor $11_1$, is connected to the output $3_2$, taken from the emitter of transistor $11_2$, the output $4_1$ of transistor $12_1$ connected with the output $4_2$ of transistor $12_2$.

Thus, the application of a positive input signal to the terminal $1_1$ produces at terminal $3_2$ a negative output signal from transistor $11_1$, and produces at terminal $4_2$ a positive output signal furnished by transistor $12_2$, provided that transistors $12_1$ and $11_2$ are blocked. Similarly, a negative input signal produces at terminal $4_2$ a positive output signal, furnished by transistor $12_1$ and produces at terminal $3_2$ a negative signal, furnished by transistor $11_2$, this due to the signal applied at $1_2$ being positive.

In FIG. 8, curves $(d)$ and $(c)$ respectively illustrate the waveshapes of the signals received at terminals $3_2$ and $4_2$, when the signal illustrated by curve $(U_0)$ is applied at terminal $1_1$ of FIG. 2.

One of the advantages of the full-wave detector of FIG. 2 is that the voltages between outputs $3_2$, $4_2$ and ground, are across a very low impedance since they are produced by completely saturated transistors arranged in the negative feedback line of an amplifier, the feedback factor of which becomes very high as soon as the amplitude of the input signals exceeds a predetermined low value.

Figure 3:
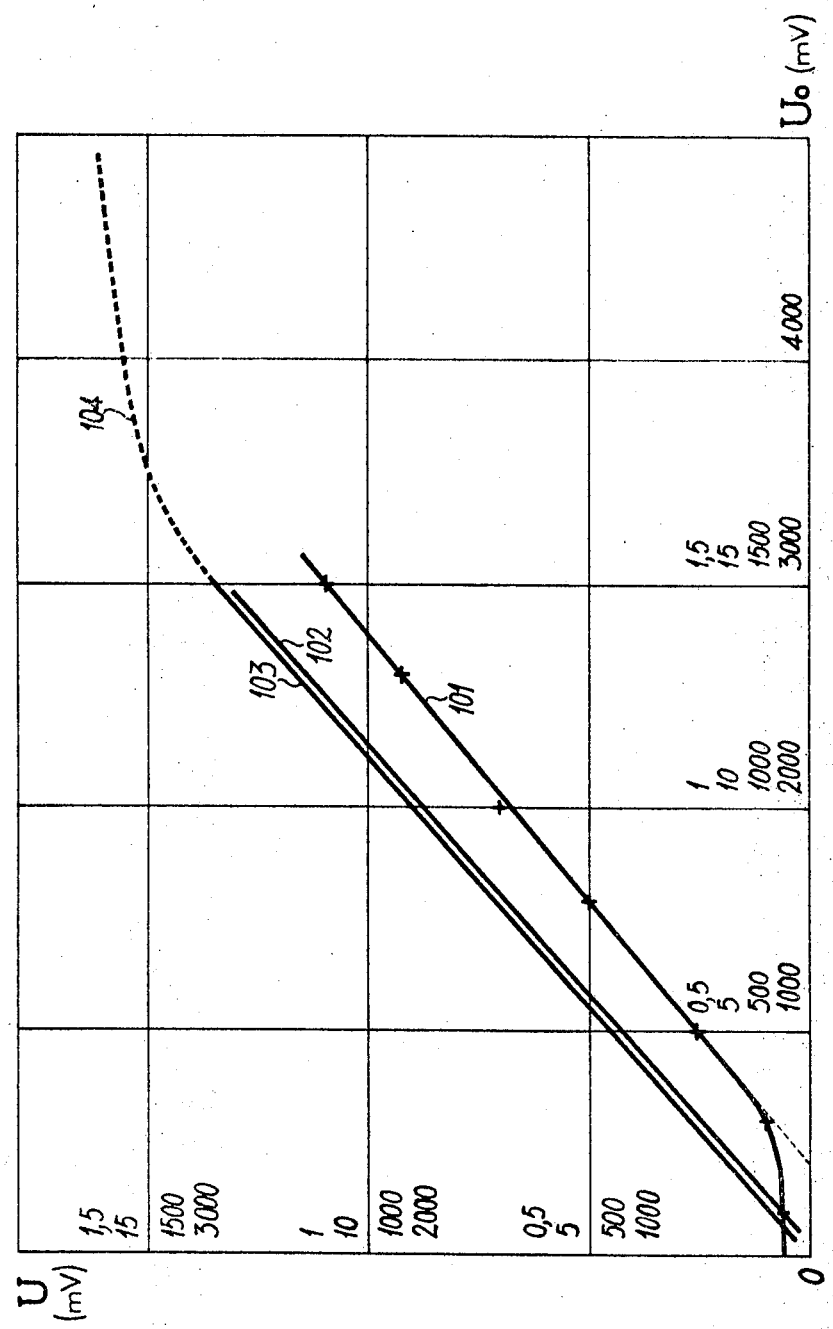
FIG. 3 is a graph showing the performance of a linear detector in accordance with FIG. 1.

In order to give an idea of the magnitudes involved, FIG. 3 illustrates the performance characteristics of a full-wave rectifier of this kind in which the amplifier $20_1$, $20_2$ have an input open-circuit impedance of $Z_e=20$ ohms, a transfer impedance $Z_f=240{,}000$ ohms and an open-circuit output impedance of $Z_s=120$ ohms. A known amplifier corresponding to these specifications has been illustrated by way of a non-limitative example in FIG. 2, where it can be seen that the amplifer $20_1$ comprises three stages using n-p-n transistors 201, 202, 203 of the 2N930 type, and a negative feedback resistor 204 of 240,000 ohms. Transistor 201, whose base is connected to capacitor $23_1$ and grounded via a resistor 205, has its emitter directly grounded and its collector connected on the one hand to the +24 volt source via a resistor 206 and on the other hand to the base of transistor 202. The latter transistor has its collector directly connected to a +24 volt source and its emitter connected to that of transistor 203 and grounded through a transistor 207. The base of transistor 203 is connected to the +24 volt source via a resistor 208 and grounded via a resistor 209; its collector is connected via a resistor 210 to the +24 volt source, via a resistor 204 to the base of transistor 201 and directly to a capacitor $24_1$. The values of resistors 205 to 210 are as follows:

| Resistor: | Ohms |
|---|---|
| 205 | 15,000 |
| 206 | 18,000 |
| 207 | 2,200 |
| 208 | 22,000 |
| 209 | 4,700 |
| 210 | 12,000 |

The specifications of the detector which, with amplifiers of thist kind, gives the detection curve of FIG. 3, are as follows:

Capacitors $23_1$, $24_1$, $23_2$, $24_2 = 1$ microfarad
Resistors $21_1$, $22_1$, $21_2$, $22_2 = 12{,}000$ ohms
Germanium transistors $11_1$, $11_2$ of the 2N396 type
Germanium transistors $12_1$, $12_2$ of the 2N1306 type
Emitter-collector resistance of transistors $11_1$, $11_2$, $12_1$, $12_2$:
  Saturated 10 ohms
  Blocked 10 megohms
Resistors $13_1$, $14_1$, $13_2$, $14_2$ equal to 2,200 ohms
Resistors $2_1$, $2_2$, $15_1$, $15_2 = R_1 = R_2 = 2{,}200$ ohms
Voltage gain of amplifiers $20_1$ and $20_2$: about 10,000 times.

The curves 101, 102, 103, 104 of FIG. 3 illustrate on different scales and in millivolts the behavior of the direct output voltage U between terminal $3_2$ and ground, as a function of the effective voltage $U_0$ of the input signal applied between terminal $1_1$ and ground, this input signal being a sinusoidal one of frequency between 100 c./s. and 100 kc./s. Using the transistors in question, the detection law does not vary appreciably in this band of frequencies and the upper limit of the band can be considerably raised by replacing the said transistors by transistors of the high frequency kind.

It will be seen that the detection curve is substantially linear, being represented by the straight line $U=0.9$ $(U_0-0.2)$ millivolt, for alternating input signals the effective voltage $U_0$ of which is between 0.3 millivolt and the voltage above which the amplifiers go into saturation, this voltage being about 3 volts for the design of FIG. 3.

Figure 4:
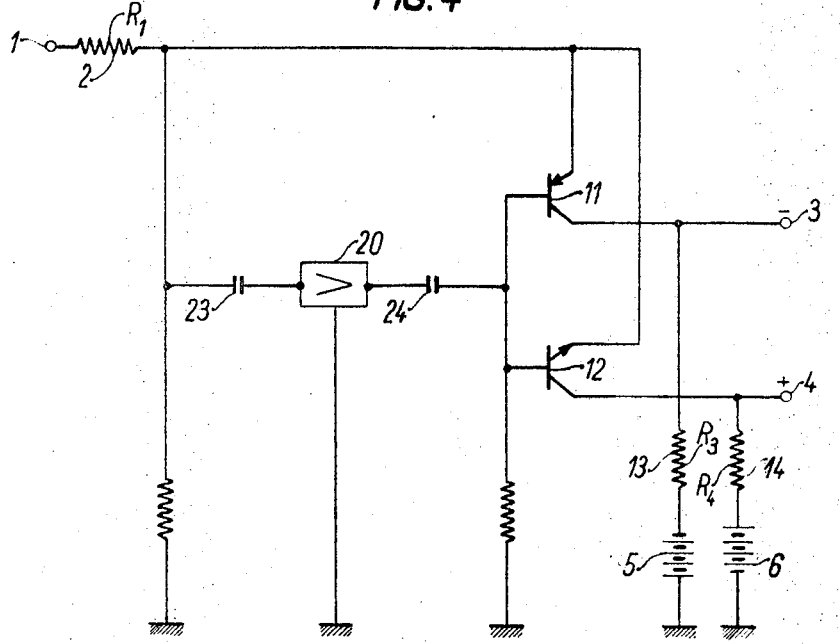
FIG. 4 illustrates a different embodiment of the detector of FIG. 1.

FIG. 4 illustrates a variant of the linear detector of FIG. 1, the common elements to these two embodiments being given the same reference numbers. This variant embodiment is characterized by the addition of two bias sources 5 and 6 supplying the collectors of 11 and 12, the purpose of this arrangement being that of preventing these transistors from operating in the saturation condition. Source 5 which links resistor 13 of resistance $R_3$ to ground, applies a bias voltage $-V_1$ to the collector of the p-n-p transistor 11 and source 6, which links resistor 14 of resistance $R_4$ to earth, applies a bias voltage $+V_2$ to the collector of the n-p-n transistor 12. In addition, since the operation of this variant of embodiment is not affected by the replacement of resistor 15 by a direct connection, thanks to the biasing of the transistor collectors, this resistor has not been shown in FIG. 4.

The unblocking of transistor 11, the current gain of which is $G_1$, by a positive input signal $U_0$, results in the production at its terminal 3 of a positive signal of amplitude $R_3G_1U_0/R_1$, i.e. a voltage $(-V_1+G_1R_3U_0/R_1)$. Similarly, the unblocking of transistor 12 having the gain $G_2$, by a negative input signal, causes the potential at terminal 4 to change to $(V_2-G_2|U_0|R_4/R_1)$. It will be seen that the current gains $G_1$ and $G_2$ of transistors 11 and 12 are virtually equal to unity and are constant even for very low input currents $I_0=U_0/R_1$, so that the detector of FIG. 4 has a constant output impedance $R_3$ or $R_4$ and extremely good linearity.

Figure 5:
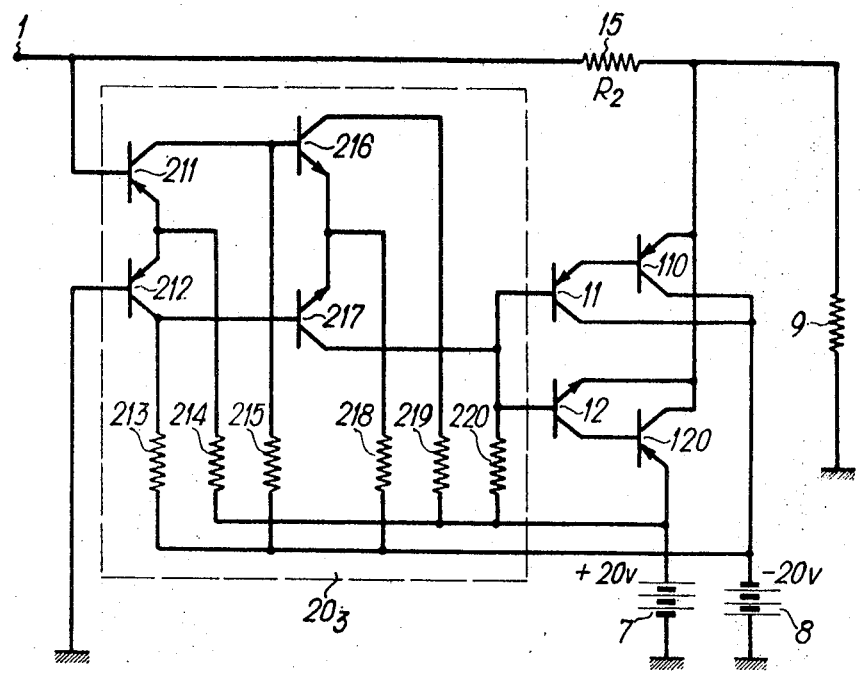
FIG. 5 is a diagram of a push-pull amplifier designed in accordance with the embodiment of FIG. 4.

FIG. 5 illustrates a push-pull amplifier based on the same principle as the detector of FIG. 4 but in which p-n-p power transistors 110, 120 have been provided in conjunction with transistors 11 and 12. Resistors 2, 13 and 14 have been omitted, resistor 15 has been reinstated and a load resistor 9 has been connected between the emitter of transistor 110 and ground. Transistor 110 is connected to transistor 11 in a Darlington circuit and their collectors are connected to the negative terminal of a bias source the positive terminal of which is grounded. Transistor 120 is connected to the opposite type transistor 12 in a similar fashion, the emitter of transistor 12 being connected to that of transistor 110 and to the collector of transistor 120, and the emitter of the latter being connected to the positive terminal of a bias source whose negative terminal is grounded. The potentials furnished by the sources 7 and 8 are symmetrical with respect to ground, and this symmetry is taken advantage of to enable a high-gain amplifier $20_3$ to be used, this being designed so that the average potentials at its input and output terminals are as near as possible the same as the ground potential, this making possible direct coupling of the negative feedback network, i.e. the deletion of capacitors 23 and 24 of FIG. 4.

The amplifier $20_3$ comprises two p-n-p transistors 211, 212 and two n-p-n transistors 216, 217. The base of transistor 211 is connected on the one hand directly to the input terminal 1, and on the other hand through the feedback resistor 15 to the emitter of transistor 110 and to the load resistor 9. The base of transistor 212 is grounded. The emitters of transistors 211, 212 are connected to the positive source 7 across a resistor 214. The collector of transistor 211 is connected to the base of transistor 216 and to the negative source 8 through a resistor 215. The collector of transistor 212 is connected to the base of transistor 217 and linked to the negative source 8 through a resistor 213. The emitters of transistors 216, 217 are connected to the negative source 8 through a resistor 218. The collector of transistor 216 is connected to the positive source 7 through a resistor 219. The collector of transistor 217 is connected through a resistor 220 to the positive source 7 and to the bases of transistors 11 and 12.

The specifications and performance characteristics of a power amplifier of the kind illustrated in FIG. 5 are listed hereinafter by way of a non-limitative example.

(A) Specifications

Amplifier $20_1$: input impedance $Z_e$—2,000 ohms
Amplifier $20_3$: transfer impedance $Z_f$—10 megohms
Amplifier $20_3$: output impedance $Z_s$—5,600 ohms
Transistors:
    211, 212—2N711 type
    217, 218—2N930 type
Resistors:
    213, 215, 219, 220—5,600 ohms
    214—12,000 ohms
    218—560 ohms
Transistors:
    11—2N396 type
    12—2N1306 type
Power transistors 110, 120—ASZ17 type (equivalent to U.S. 2N1668 type)
Resistor 15—$R_2$=1,500 ohms
Sources 7 and 8—20 volts
Load resistor 9—15 ohms
Voltage gain of amplifier $20_3$—about 10,000 times (B) Performance characteristics The performance figures listed hereinafter were obtained using unmatched power transistors. Experience has shown that these figures are independent of the differences which may arise in the gain figures or other characteristics of the transistors:

(a) working frequency band at 3 decibels attenuation: 0 to 50,000 c./s.;
(b) linearity departure: lesser than 0.05 db for an output voltage varying between 0.2 millivolt (r.m.s. value) and 11.5 volts (r.m.s. value);
(c) non-linear distortion within the 0–15,000 c./s. frequency band: relative second harmonic level: below −65 db for any signal in the range 0.2 millivolt to 11.5 volts (r.m.s. value) relative third harmonic level: below −55 db for a signal anywhere in the range;
(d) response to square-wave pulse signals: very good up to 45,000 c./s.

Finally, it should be pointed out that the circuits described hereinbefore can be built from miniaturized components.

Figure 6:
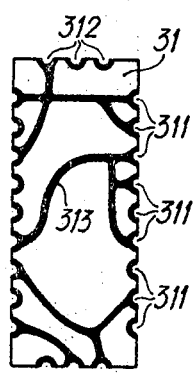
FIGS. 6 and 7 illustrate a miniaturized embodiment of the circuits of FIG. 1.
Figure 7:
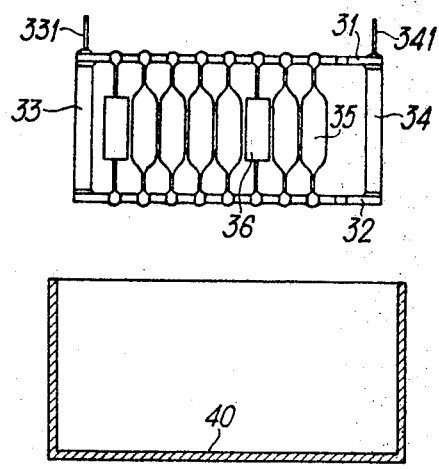

For example, a circuit of the kind illustrated in FIG. 1 can be contained, as FIGS. 6 and 7 show, in two parallelepipedic housings of dielectric material, having the dimensions:

| | Millimeters |
|---|---|
| Length | 30 |
| Width | 15 |
| Height | 15 |

Each housing contains a chassis in the form of two rectangular plates of dielectric material 31, 32, held parallel to one another by metal supports 33, 34.

The plates 31 and 32 have the following dimensions:

| | Millimeters |
|---|---|
| Length | 26.5 |
| Width | 11 |
| Thickness | 0.7 |

Along the longer sides, nine notches 311 are formed. The shorter sides contain three notches 312. The inner surfaces of these notches, as well as the edges on front and rear faces of the plate, are metallized. These same notches are linked together in groups by metallic connections 313, printed on the front and rear of the plate and disposed in accordance with the circuit it is desired to produce.

The two connecting wires forming the terminals of the resistors, such as 35, or the capacitors, such as 36, are soldered into mutually opposite notches in the plates 31 and 32, being linked together through the printed circuit.

As far as the transistors are concerned, their casings are arranged inside the space formed between the two plates 31 and 32. The three electrode connections of these transistors are soldered to two notches on one plate and to one notch on the other.

The supports, 33 and 34, each carry an extension at one of their ends, for instance 331 and 341, which projects beyond one of the plates. These extensions constitute the various outside terminals of the circuits, i.e. the input and output terminals, the terminals connecting the circuit to bias sources, etc. The number of supports therefore depends upon the number of such terminals required.

What is claimed is:
1. A linear detector for separately rectifying the two half-waves of alternating current electric signals, having a first non-grounded and a second grounded input terminal between which said signals are applied and two non-grounded and one grounded output terminals, said rectified half-waves being respectively received between one corresponding of latter said non-grounded output terminals and latter said grounded output terminal; said detector comprising a high gain phase-inverting amplifier provided with a non-grounded input terminal, a grounded input terminal, a non-grounded output terminal, and a grounded output terminal and a non-linear negative feedback circuit interconnecting said non-grounded input and output terminals of said amplifier; said detector further comprising a first resistor interconnecting said non-grounded input terminals of said detector and amplifier and direct connection means between said grounded input terminals of said detector and amplifier; said non-linear feedback circuit consisting of the series assembly of a second resistor having one of its ends connected with said non-grounded input terminal of said amplifier and its other end connected with a first terminal of a non-linear impedance the second terminal of which is connected with said non-grounded output terminal of said amplifier; said detector further comprising other direct connection means interconnecting said grounded input and output terminals of said amplifier with said grounded output terminal of said detector; and said non-linear impedance consisting of the parallel connection of two transistors of opposite types of conductivity each having a base electrode, an emitter electrode and a collector electrode, said second and first terminals of said non-linear impedance respectively consisting of the parallel- connected base electrodes and of selected ones of same name of said emitter and collector electrodes of said transistors in parallel connection; said non-grounded output terminals of said detector being directly and respectively connected with the electrodes of said transistors other than said base and selected electrodes.

2. A detector as claimed in claim 1, in which said selected electrode of said transistors is their emitter electrode.

3. A detector as claimed in claim 1, in which said transistors are respectively fed from one and the other of two direct-current sources of opposite polarities, and in which said second resistor has a substantially zero resistance.

4. An arrangement comprising two detectors each including a pair of transistors as claimed in claim 1 and having two non-grounded output terminals each of which is connected with two transistors respectively belonging to one and the other of said pairs and having a common conductivity type different for one and the other of said two non-grounded output terminals, in which said eslected electrodes of the pair of transistors belonging to one of said two detectors are connected with the first input terminal of the other of said two detectors, said first and second resistors respectively having equal resistance values in one and the other of said two detectors, whereby there appear at latter said output terminals rectified voltages of opposite polarities each having an instantaneous amplitude proportional to that of said input signal, whatever be the instantaneous polarity of latter said input signal.

5. A power amplifier built by means of two detectors as claimed in claim 1, each comprising a high-gain amplifier and a transistor, in which the same input signals are directly applied to the inputs of both said high-gain amplifiers, said first resistor having a substantially zero resistance in both of said detectors, and in which said selected electrodes are connected with a common load circuit for said power amplifier.

References Cited
UNITED STATES PATENTS

| | | |
|---|---|---|
| 3,154,639 | 10/1964 | Rakha et al. |
| 3,012,136 | 12/1961 | Kubota. |
| 3,378,779 | 4/1968 | Priddy _____ 329—101 |

ALFRED L. BRODY, Primary Examiner

U.S. Cl. X.R.

329—166, 169; 307—235; 330—28; 325—319, 397